US012322236B2

(12) United States Patent
Glinert

(10) Patent No.: US 12,322,236 B2
(45) Date of Patent: Jun. 3, 2025

(54) COUNTERFEIT PREVENTATIVE BARCODES

(71) Applicant: Multi Packaging Solutions, Inc., Lansing, MI (US)

(72) Inventor: Kenneth L. Glinert, Chappaqua, NY (US)

(73) Assignee: Multi Packaging Solutions, Inc., Atlanta, GA (US)

( * ) Notice: Subject to any disclaimer, the term of this patent is extended or adjusted under 35 U.S.C. 154(b) by 0 days.

(21) Appl. No.: 18/024,385

(22) PCT Filed: Jul. 22, 2021

(86) PCT No.: PCT/US2021/042811
§ 371 (c)(1),
(2) Date: Mar. 2, 2023

(87) PCT Pub. No.: WO2022/020615
PCT Pub. Date: Jan. 27, 2022

(65) Prior Publication Data
US 2024/0013603 A1    Jan. 11, 2024

Related U.S. Application Data

(60) Provisional application No. 63/054,868, filed on Jul. 22, 2020.

(51) Int. Cl.
*G07D 7/0043* (2016.01)
*B42D 25/20* (2014.01)
(Continued)

(52) U.S. Cl.
CPC ......... *G07D 7/0043* (2017.05); *B42D 25/285* (2014.10); *B42D 25/328* (2014.10);
(Continued)

(58) Field of Classification Search
CPC ............ B65D 2203/02; B65D 2203/12; B65D 2203/06; B65D 2401/00; B65D 25/22;
(Continued)

(56) References Cited

U.S. PATENT DOCUMENTS

2006/0022059 A1* 2/2006 Juds ................. G06K 19/06056
235/494
2007/0045404 A1* 3/2007 Andersen ............... G06Q 20/20
235/380
(Continued)

FOREIGN PATENT DOCUMENTS

CN        202183109 U     4/2012
JP        H09311616 A    12/1997
(Continued)

OTHER PUBLICATIONS

Behrens, "Method to Emboss Holograms into the Surface of Sheet Metals" (Year: 2013).*

(Continued)

*Primary Examiner* — Thien T Mai
(74) *Attorney, Agent, or Firm* — Neil G. Cohen; Rohini K. Garg

(57) ABSTRACT

Packaging comprising: (a) a prepaid card at least partially enclosed within the packaging, the prepaid card including a barcode at least partially visible through a cutout in the packaging; and (b) a reference barcode located on the packaging, wherein the reference barcode is compared to the barcode of the prepaid card to ensure the reference barcode has the same or similar design to that of the barcode of the prepaid card to identify counterfeit or tampered with packaging.

20 Claims, 3 Drawing Sheets

(51) Int. Cl.
    *B42D 25/328*     (2014.01)
    *B65D 25/22*     (2006.01)
    *B65D 73/00*     (2006.01)
    *G06K 19/06*     (2006.01)
    *G07D 7/00*     (2016.01)

(52) U.S. Cl.
    CPC .......... *B65D 25/22* (2013.01); *B65D 73/0085* (2013.01); *G06K 19/06028* (2013.01); *G06K 19/06065* (2013.01); *G07D 7/0032* (2017.05); *B65D 2203/02* (2013.01); *B65D 2203/06* (2013.01); *B65D 2401/00* (2020.05)

(58) Field of Classification Search
    CPC ............ B65D 73/0085; B65D 73/0078; B65D 73/0028; B65D 73/0042; B65D 73/0007; B65D 2251/023; B65D 27/14; G06K 19/06065; G06K 19/06028; G06K 19/06037; G07D 7/0043; G07D 7/0032; G07D 7/0034
See application file for complete search history.

(56) References Cited

U.S. PATENT DOCUMENTS

| | | | | |
|---|---|---|---|---|
| 2012/0256006 | A1* | 10/2012 | Schmitt | B65D 75/566 |
| | | | | 235/487 |
| 2013/0166455 | A1* | 6/2013 | Feigelson | H04L 9/3234 |
| | | | | 705/64 |
| 2014/0076978 | A1 | 3/2014 | Smith et al. | |

FOREIGN PATENT DOCUMENTS

| | | | | |
|---|---|---|---|---|
| JP | 11291681 A | * | 10/1999 | |
| WO | WO-9909528 A1 | * | 2/1999 | .......... G07D 7/0032 |

OTHER PUBLICATIONS

Hartl, "Efficient Verification of Holograms Using Mobile Augmented Reality" (Year: 2015).*

International Search Report issued in corresponding PCT Patent Application No. PCT/US2021/042811 on Nov. 4, 2021.

* cited by examiner

COUNTERFEIT PREVENTATIVE BARCODES

This application is a U.S. National Stage Application, filed under 35 U.S.C. 371, of International Patent Application No. PCT/US2021/042811, filed Jul. 22, 2021, which claims priority to U.S. Provisional Patent Application No. 63/054,868, filed Jul. 22, 2020, the entire content of these applications is incorporated herein by reference.

FIELD

The present teachings generally relate to prepaid card packaging, and more particularly, to a prepaid card having a color gradient bar code with a pattern matching an associated pattern on the packaging.

BACKGROUND

Prepaid cards, such as gift cards, have become more prevalent and popular in many consumer industries. For example, a customer may visit a local hardware or grocery store and purchase prepaid gift cards for a variety of categories, including restaurants, clothing, hardware, groceries, electronics, online stores, or a combination thereof. As popularity of prepaid cards continues to increase so does the need for adequate protection of the prepaid cards. Often, a fraudulent individual (i.e., a "fraudster") may walk into a store that sells prepaid cards and place counterfeit barcodes over the cards' barcodes or identification information. When a genuine customer loads a card with money at the store's register, the counterfeit barcode is scanned, thereby transferring the customer's money to the fraudster's account. As a result, the fraudster quickly spends or moves the funds before the customer can use the prepaid card, thereby rendering the prepaid card worthless.

To combat the increase in prepaid card fraud, prepaid card and packaging manufacturers have developed a variety of ways to prevent tampering, to indicate if a prepaid card packaging has been tampered with, or both. For example, prepaid card barcodes have become increasingly more complex by including basic gradients or colors to prevent fraudsters from printing similar barcodes on a conventional printer. However, fraudsters continue to improve their methods of replicating barcodes, thereby demanding even further improvement in tamper-preventative measures currently being taken.

Thus, there remains a need for packaging that further prevents tampering. What is needed is a barcode having a more complex design that makes it difficult to reproduce through conventional printing means. Additionally, there remains a need for packaging that promotes visual inspection of the packaging and a prepaid card included therein prior to activation. What is needed is packaging having a visual comparison to effectively identify counterfeit barcodes. Moreover, there remains a need for prepaid card barcodes that include multiple features to prevent counterfeit reproduction yet still allow the barcodes to be scanned. What is needed is a barcode having one or more gradients, one or more holograms, or both that do not inhibit scanning of the barcodes.

SUMMARY

The present teachings meet one or more of the present needs by providing packaging comprising: (a) a prepaid card at least partially enclosed within the packaging, the prepaid card including a barcode at least partially visible through a cutout in the packaging; and (b) a reference barcode located on the packaging, wherein the reference barcode is compared to the barcode of the prepaid card to ensure the reference barcode has the same or similar design to that of the barcode of the prepaid card to identify counterfeit or tampered with packaging.

The present teachings provide packaging, wherein: the barcode of the prepaid card and the reference barcode each include a matching hologram to visually compare; the hologram is printed directly over the barcode; the reference barcode is located within a warning label located on a panel of the packaging; the warning label is positioned in close proximity to the barcode of the prepaid card to allow for easy visual comparison of the barcode of the prepaid card and the reference barcode; the warning label further includes a textual description describing the hologram; the barcode of the prepaid card includes a color gradient at least partially extending along the barcode of the prepaid card to vary the color of the barcode; the color gradient is adjusted along the barcode of the prepaid card to form an image directly within the barcode of the prepaid card; the packaging prevents a counterfeit barcode placed over the barcode of the prepaid card being scanned and loaded with funds from a genuine customer; the barcode of the prepaid card is visible in its entirety through the cutout; the prepaid card is positioned between opposing panels of the packaging to prevent removal of the prepaid card without destruction of the packaging; the hologram is transparent and the barcode of the prepaid card is scannable through the hologram; the hologram is a pattern printed over the barcode of the prepaid card that matches a pattern of the hologram printed over the reference barcode; the packaging further includes a secondary barcode separate from the barcode of the prepaid card and the reference barcode; the barcode of the prepaid card is larger in dimensions than the reference barcode; the barcode of the prepaid card extends vertically along a length of the packaging while the reference barcode extends horizontally along a width of the packaging; the packaging includes a first panel disposed on top of a second panel, and the cutout and the reference barcode are both located on the first panel; or a combination thereof.

The present teachings provide a method of loading a prepaid card, comprising: (a) visually comparing the barcode of the prepaid card to the reference barcode to ensure the barcode of the prepaid card and the reference barcode have the same or similar design; (b) scanning the barcode of the prepaid card; and (c) scanning a secondary barcode located on the packaging, wherein if the barcode of the prepaid card does not match the reference barcode, the packaging is considered to be tampered with and is disposed of. Furthermore, the secondary barcode may be scanned prior to scanning the barcode of the prepaid card, and the secondary barcode is different than the barcode of the prepaid card.

Additionally, the present teachings meet one or more of the present needs by providing: packaging that further prevents tampering; a barcode having a more complex design that makes it difficult to reproduce through conventional printing means; packaging that promotes visual inspection of the packaging and a prepaid card included therein prior to activation; packaging having a visual comparison to effectively identify counterfeit barcodes; prepaid card barcodes that include multiple features to prevent counterfeit reproduction yet still allow the barcodes to be scanned; a barcode having one or more gradients, one or more holograms, or both that do not inhibit scanning of the barcodes; or a combination thereof.

DETAILED DESCRIPTION

Figure 1:
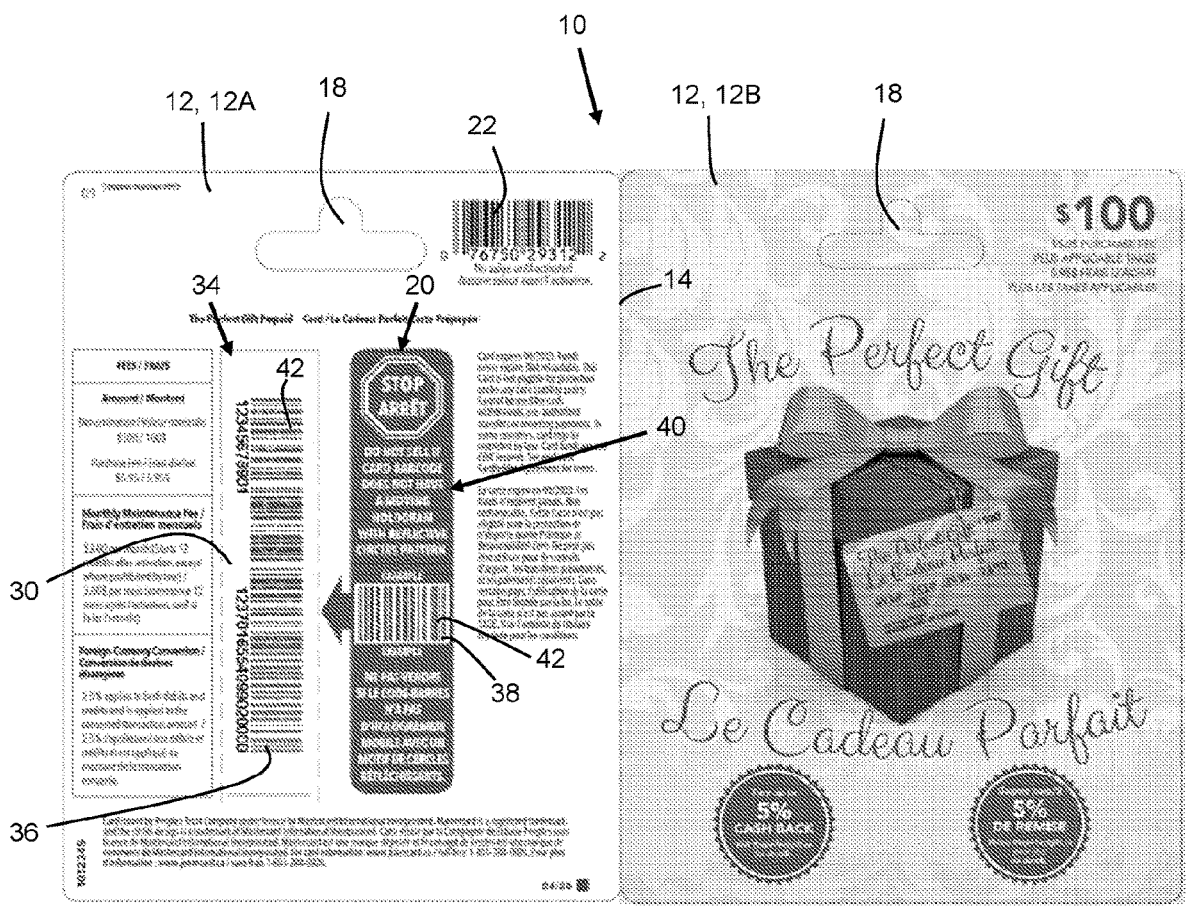
FIG. 1 is a top-down view of packaging of a prepaid card.

The explanations and illustrations presented herein are intended to acquaint others skilled in the art with the invention, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings generally relate to packaging. The packaging may function to securely house one or more items. The packaging may function to prevent tampering with the one or more items prior to a rightful owner opening the packaging. The one or more items may be a prepaid card, gift card, other loadable and/or scannable item, or a combination thereof. It is contemplated that the packaging may be configured to secure any type of item. The packaging may include one or more layers. For example, the packaging may include two or more layers, three or more layer, or four or more layers. The packaging may include six or less layers, five or less layers, or four or less layers. Alternatively, the packaging may be a single layer. For example, the packaging may be a single layer having a cavity formed therein to secure a prepaid card. The packaging may include one or more tamper resistant features, one or more tamper prevention features, or both. For example, the packaging may include cut-resistant material so that a fraudster is unable to discretely cut into the packaging without damaging the packaging. The packaging may be substantially monolithically formed (i.e., the packaging is integrally formed from a single piece of material). The packaging may be shaped to meet the needs of any desired industry. For example, the packaging may be shaped to have an inner pocket substantially the size of a prepaid card to minimize wasted material.

The packaging may include one or more panels. The panels may function to form an outer shell of the carrier. The panels may provide structural support to the carrier. The panels may house one or more items, such as a prepaid card or gift card. For example, a first panel and a second panel may form a clamshell-like structure around a prepaid card to protect the prepaid card from fraudulent activity. The carrier may include one or more panels, two or more panels, or three or more panels. The carrier may include six or less panels, five or less panels, or four or less panels. Each panel may include a plurality of layers or may be monolithically formed. The one or more panels may be integrally formed with one another to improve manufacturing efficiency and decrease material waste. For example, the one or more panels may be die cut from a single layer of stock and interconnected via one or more perforations, fold lines, or both.

The panels may be made from any material. The panels may be made from paperboard, cardboard, corrugated fiberboard, polyethylene terephthalate (PET), high-density polyethylene (HDPE), polyvinyl chloride (PVC), low-density polyethylene (LDPE), polypropylene (PP), polystyrene (PS), acrylic, nylon, polycarbonate, polylactic acid, or a combination thereof. The panels may include a surface finish. The panels may include a finish stamping to indicate a desired product and/or brand. The panels may include a protective coating. For example, the panels may include a UV-resistant and/or moisture-resistant coating to protect the prepaid card from damaging light and/or moisture.

The panels may be manufactured using a variety of methods. The panels may be thermoformed, cold pressed, stamped, molded, corrugated, calendered, or a combination thereof. The panels may be die cut or trimmed to form a desired shape of the panels. As a result, the panels may include one or more holes, apertures, punch outs, perforations, scorings, or a combination thereof. The panels may include a plurality of operations to form a final design of the panels. The panels may include an initial die cutting step to create a peripheral shape of the panels and may include a secondary die cutting step to form the holes, punch outs, perforations, scoring, cutouts, or a combination thereof. However, it is contemplated that the panels may be manufactured in a single operation. For example, the panels may be formed using a single die cut operation where the shape of the panels and the secondary features (e.g., scoring marks) of the panels are cut simultaneously.

The panels may be interconnected by a fold line. The fold line may function to provide a hinge point between the panels. The fold line may allow the panels to fold onto one another to form the clamshell-like structure. The fold line may be integrally formed with panels. For example, the fold line may be a partial cut within the panels that provides a flexible point to fold the panels relative to each other. The partial cut may go through any desired thickness of the panels. For example, the fold line may have a depth of about 1 mm or more, about 2 mm or more, or about 3 mm or more. The fold line may have a depth of about 6 mm or less, about 5 mm or less, or about 4 mm or less. The fold line may have a depth of about 20% or more, about 40% or more, or about 60% or more of the relative thickness of the panels. The fold line may have a depth or about 90% or less, about 80% or less, or about 70% or less of the relative thickness of the panels. The fold line may be free of any cut. For example, the fold line may be a localized elastic portion between panels that allows bending of the panels relative to each other.

The panels may include an aperture. The aperture may function as a hanging mechanism so that the carrier may be hung from one or more display hooks. The aperture may be any desired size and shape. The aperture may extend through an entire thickness of the panels. Each panel may include an aperture. For example, a first panel and second panel may each include an aperture having a substantially similar shape so that, when the first panel and second panel are joined together to form the packaging, the aperture of the first panel aligns with the aperture of the second panel so that a hook may extend through the packaging. The aperture may be positioned anywhere along the panels. The aperture may be positioned along a periphery of the panels so that a pocket housing the prepaid card is not accessible through the aperture. The aperture may be a die cut hole in the panels or may be punched out after manufacturing the panels.

The packaging may also include a cutout. The cutout may function as an entry to reach a prepaid card within the packaging. The cutout may function to provide a retail store, a customer, a manufacturer, or a combination thereof a window to confirm if a prepaid card is present within the carrier. The cutout may provide an access point to view a barcode of the prepaid card. The cutout may be a window that extends into a pocket of the carrier. The cutout may be any desired size and shape. The cutout may have dimensions smaller than dimensions of the prepaid card, smaller than dimensions of a barcode or identification number printed on the prepaid card, or both. Therefore, it is contemplated that a user or operator may identify a prepaid card within the carrier without being able to fully scan or copy a barcode and/or identification number of the prepaid card.

It is envisioned that the packaging described herein deters tampering with the prepaid cards located within the packaging. A barcode of the prepaid card may be designed to help with such deterrence. Because the barcode of the prepaid card may be at least partially visible when in the packaging to allow a retail associate to scan the barcode, the barcode may be at risk of duplication. Fraudsters may often attempt to adhere a counterfeit barcode directly over the barcode of the prepaid card, thereby making a genuine customer inadvertently preload a "dummy" account tied to the fraudster.

To counteract such activity, the barcode may be designed to make it difficult for a fraudster to reproduce the barcode using a conventional printer, conventional barcode software, or both. The barcode may include one or more color gradients along at least a portion of the barcode. The color gradients may alter a color of the barcode through one or more hues, one or more shades, or both. For example, a barcode may have a first portion that is purple and a second portion that is blue. The first portion and the second portion may be connected via a connecting portion having a plurality of different shades of color spanning between purple and blue.

Additionally, the color gradients may form one or more images printed directly into the barcode. The color of the barcode may be changed in localized areas to form one or more images that are more difficult for a fraudster to reproduce. The image may be one or more characters, one or more words, one or more shapes, one or more designs, one or more pictures, any other type of image, or a combination thereof. Thus, the present teachings beneficially provide a visual inspection for customers and retail associates.

The prepaid card barcode may also include a hologram. The hologram may function as a secondary visual inspection to ensure that the barcode is genuine. The hologram may function as a further security measure to prevent counterfeit reproduction of the barcode. The hologram may be transparent or semi-transparent. Thus, the hologram may beneficially allow the barcode to be scanned directly through the hologram. The hologram may be any type of printing. The hologram may be reflective, translucent, or both.

The hologram may be positioned anywhere relative to the barcode. The hologram may be located adjacent to the barcode or directly over the barcode. The hologram may be printed under the barcode, over the barcode, or both. The hologram may extend over a portion of the barcode or an entire length of the barcode.

The hologram may be any desired size and/or shape. The hologram may be any design. The hologram may be one or more words, one or more characters, one or more images, one or more patterns, or a combination thereof. The hologram may be uniform or may vary to even further prevent successful unwanted reproduction. The hologram may also be any color.

The barcode of the prepaid card may be compared to a reference barcode located on the packaging. The reference barcode may function as a visual check for customers and retail associates to compare against the prepaid card barcode. The reference barcode may have a similar or identical pattern as the barcode of the prepaid card. If the reference barcode does not match the prepaid card barcode, then a customer or retail associate may visually see that the prepaid card has been tampered with.

Therefore, the reference barcode may include a color gradient, hologram, or both similar to the barcode of the prepaid card. It should be noted, however, that the reference barcode may have different dimensions than the prepaid card barcode and/or may not have the exact same pattern. Accordingly, the reference barcode may provide a similar design to help a customer or retail associate identify certain features of the prepaid card barcode that should be the same as the reference barcode. Additionally, the reference barcode may be scannable if a secondary scanning operation is needed to load the prepaid card (in addition or in lieu of one or more secondary barcodes located along the packaging being scanned).

The reference barcode may be located within a warning label. The warning label may be positioned anywhere along the packaging. The warning label may provide an easily identifiable and eye-catching portion of the packaging to alert customers and retail associates. Thus, the customer or retail associate may be more likely to conduct a visual check to compare the reference barcode and the prepaid card barcode. To alert the customer, the warning label may be vibrant or bright colors, distinguished colors, include one or more patterns or shapes (e.g., a red "STOP" sign), or a combination thereof.

The warning label may be located anywhere on the packaging. However, it may be beneficial to position the warning label near or adjacent to the prepaid card barcode to allow for easy comparison between the prepaid card barcode and the reference barcode.

The warning label may also include a description. The description may be a written description of certain features within the reference barcode that should be identical or similar to certain features within the prepaid card barcode. For example, the description may reference a reflective circle pattern present in the reference barcode that should also be present in the prepaid card barcode. However, the description may be any description desired that describes all or a portion of the prepaid card barcode, the reference barcode, or both.

Turning now to the figures, FIG. 1 illustrates a top-down view of packaging 10 of a prepaid card 30. The packaging 10 includes a plurality of panels 12. A first panel 12A is adjoined to a second panel 12B by a fold line 14 so that the panels 12 may be folded along the fold line 14 to abut one another and at least partially enclose the prepaid card 30. The first panel 12A and the second panel 12B may also each include an aperture 18 that align when the panels 12 are folded along the fold line 14, thereby creating a hole extending through an entire thickness of the packaging 10.

The prepaid card 30 may be positioned within the packaging 10 so that a barcode 36 of the prepaid card 30 is visible within a cutout 34 of the first panel 12A. It should be noted that while the cutout 34 is located on the first panel 12A, the cutout may be positioned anywhere along either panel 12 of the packaging 10. The barcode 36 of the prepaid card 30 may be any size, shape, dimensions, or a combination thereof. The barcode 36 may also include one or more color gradients to make the barcode 36 more complex and difficult to reproduce on a conventional home printer that a fraudster may purchase. For example, the barcode 36 may include a color gradient that ranges from a purple shade to a blue shade across a length of the barcode. However, any colors may be utilized within the barcode 36. Additionally, the barcode 36 may include an image formed within the barcode 36 based upon the color gradient (see FIG. 4).

To further combat counterfeiting the prepaid card 30 barcode 36, the barcode 36 may include one or more holograms 42 printed directly over the barcode 36, directly under the barcode 36, or both. Advantageously, the holograms 42 may provide an additional security layer that is difficult to reproduce by a fraudster using barcode software and conventional printing techniques. Additionally, the holograms 42 may beneficially allow the barcode 36 to be scanned in a conventional manner.

When a customer purchases a prepaid card 30 at a retail store, the customer takes the packaging 10 (including the prepaid card 30 inside of the packaging 10) to a register. A retail associate would then scan the barcode 36 of the prepaid card 30 along with a secondary barcode 22 on the packaging 10. The prepaid card 30 would then be loaded by applying a desired amount of funds to the prepaid card 30 or within an electronic bank account associated with the prepaid card 30. The customer would then be able to use the prepaid card 30 for a future purchase.

To further ensure the above process is completed with a genuine prepaid card 30, a warning label 20 may be present on the packaging 10. While the warning label 20 may be located anywhere along the packaging 10, it may be beneficial to position the warning label 20 directly near or adjacent to the barcode 36 of the prepaid card 30. The warning label 20 may include any coloring, wording, shapes, images, or a combination thereof that visually draw a customer and/or retail associate to the warning label 20. For example, as illustrated, the warning label 20 may include a "STOP" sign at the top of the warning label 20 to alert customers.

The warning label 20 may include a reference barcode 38. The reference barcode 38 may further include a hologram 42 similar or the same as the hologram 42 within the prepaid card 30 barcode 36. To ensure the prepaid card 30 is genuine, the customer and/or the retail associate may compare the prepaid card 30 barcode 36 to the reference barcode 38 and visually check whether the holograms 42 match one another. As shown, the hologram 42 of the barcode 36 and the hologram 42 of the reference barcode 38 both have a reflective circular pattern. If the holograms 42 do not match one another, then the customer and the retail associate know that the prepaid card 30 has been tampered with and should not be loaded with any funds. Additionally, to mitigate counterfeiting even further, the warning label 20 includes a description 40 that accompanies the reference barcode 38. The description 40 may be a textual explanation of what the hologram 42 of the reference barcode 38 and the prepaid card 30 barcode 36 should look like. Thus, a customer may be provided with adequate means to check that the prepaid card 30 being purchased is valid.

Figure 2:
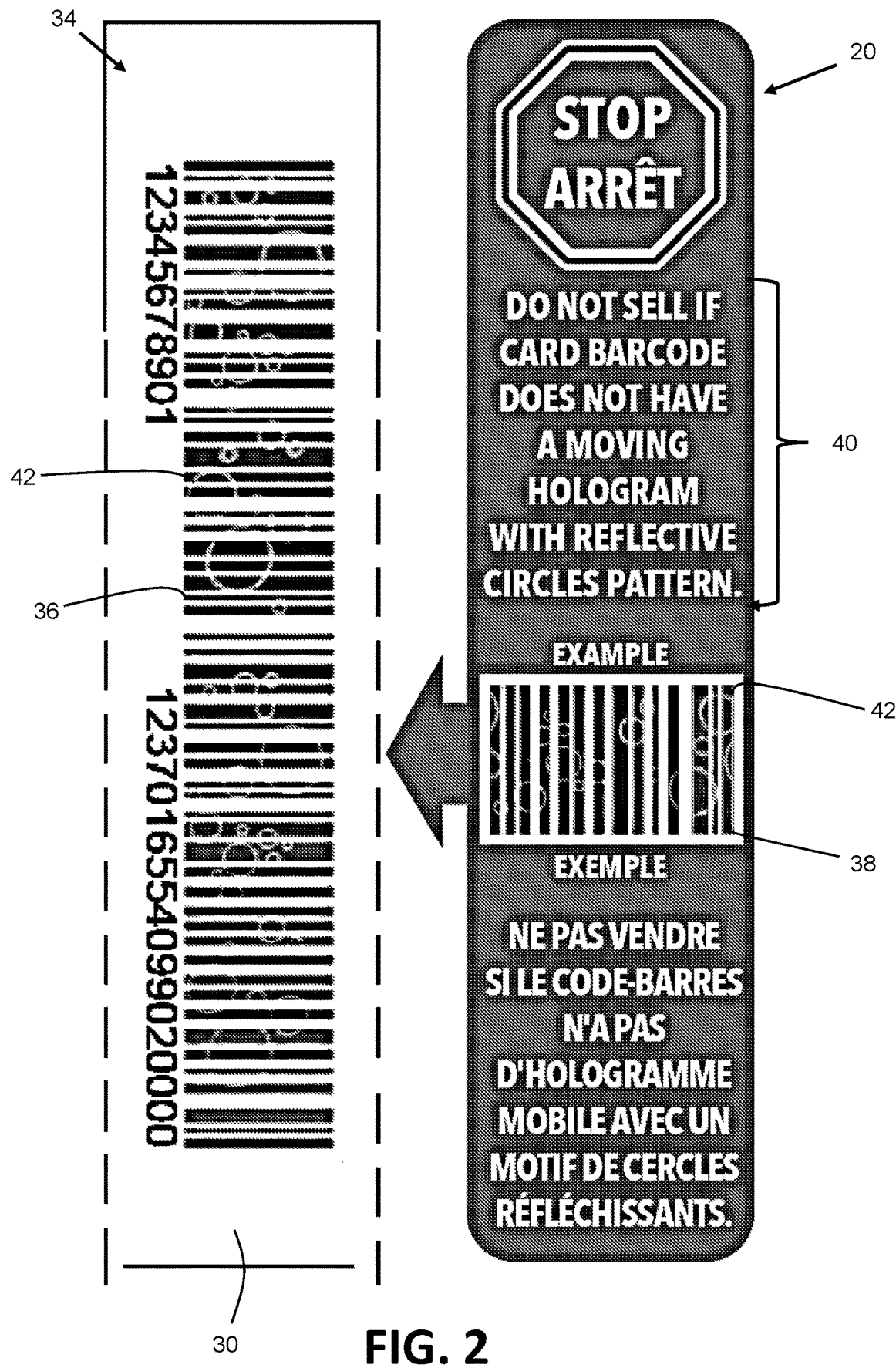
FIG. 2 is a close-up view of the prepaid card barcode and a warning label.

FIG. 2 illustrates a close-up view of the prepaid card 30 barcode 36 and the warning label 20 of FIG. 1. As illustrated, both the barcode 36 of the prepaid card 30 and the reference barcode 38 include a matching hologram 42. The hologram 42 as illustrated is a set of reflective circles extending along substantially all or an entirety of the prepaid card 30 barcode 36 and the reference barcode 38. The warning label 20 also includes a description 40 describing the hologram 42 in words to even further aid a customer or retail associate in comparing the prepaid card 30 barcode 36 and the reference barcode 38. Additionally, the reference barcode 38 and the prepaid card 30 barcode 36 may each include the same color gradient to make visual comparison easier. It should be noted that while the entire prepaid card 30 barcode 36 is visible within the cutout 34 of the packaging 10 in the figures, only a portion of the barcode 36 may be shown if desired. For example, a portion of the barcode 36 may be hidden by the panels 12 of the packaging 10.

Figure 3:
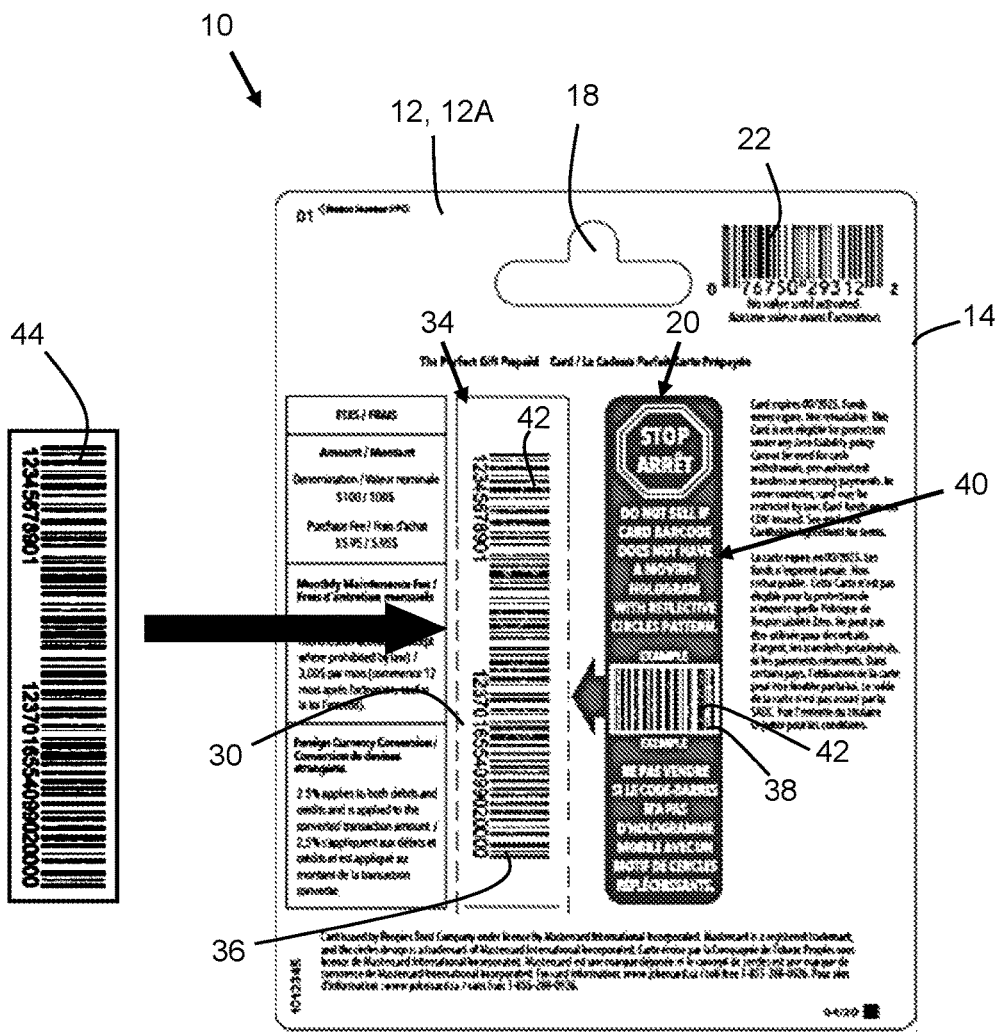
FIG. 3 is a perspective view of a tampered prepaid card.

FIG. 3 illustrates a perspective view of tampering done on a prepaid card 30. The prepaid card 30 may be located within packaging 10 as described above. The packaging 10 may include one or more panels 12. As illustrated, the first panel 12A and a second panel may be folded along a fold line 14 to at least partially enclose the prepaid card 30 (see FIG. 1). The panels 12 may include an aperture 18 extending through a thickness of the packaging 10 to hang the packaging 10 or otherwise mount the packaging 10 within a display (e.g., on a hook). The prepaid card 30 may be positioned within the packaging 10 so that a barcode 36 is at least partially visible through a cutout 34 of the packaging 10, thereby allowing a retail associate to scan the barcode 36 and activate the prepaid card 30. Additionally, the retail associate may also scan a secondary barcode 22 on the packaging to ensure proper activation.

As illustrated, a fraudster may seek to counterfeit the prepaid card 30 within the packaging. To do so, the fraudster may try to place a counterfeit barcode 44 directly over the prepaid card 30 barcode 36. The counterfeit barcode 44 may look identical to the valid barcode 36 yet be linked back to an account of the fraudster to receive any funds loaded onto the prepaid card 30 by a genuine customer. As a result, the fraudster may use such funds and render the customer's prepaid card 30 useless.

To combat such fraudulent activity, the prepaid card 30 barcode 36 may include a hologram 42 having any desired shape, image, wording, or a combination thereof directly over the barcode 36. The hologram 42 and barcode 36 combination may then be compared to an identical or very similar reference barcode 38 having the same hologram 42. The reference barcode 38 may be located within a warning label 20 on the packaging 10 near the prepaid card barcode 30 for easy visual inspection. Additionally, the warning label 20 may include a description 40 of what the barcodes should illustrate, what the holograms should look like, or both. Thus, if the counterfeit barcode 44 is placed on the prepaid card 30, the customer or retail associate can do a visual inspection and see that the counterfeit barcode 44 does not match the reference barcode 38. As a result, the counterfeit packaging 10 can then be disposed of and a new, genuine prepaid card 30 may be loaded for the customer.

Figure 4:
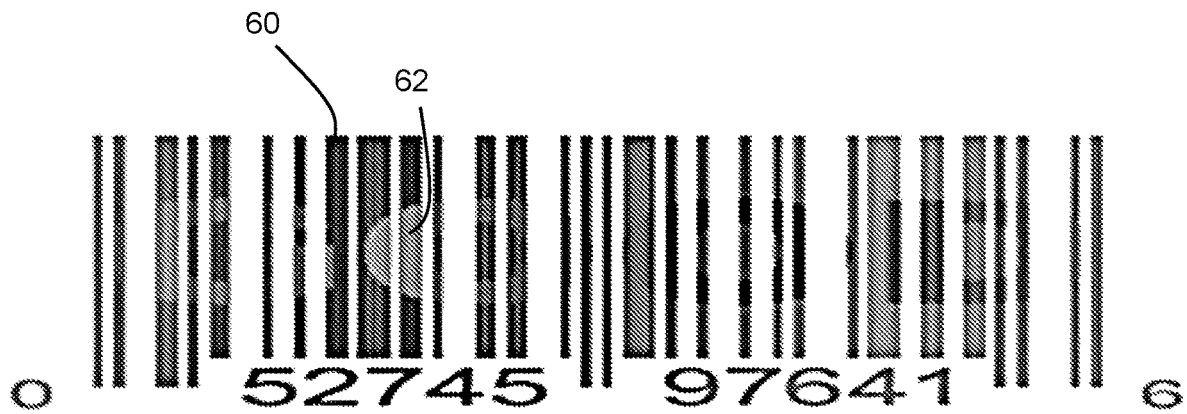
FIG. 4 is an example of a color gradient barcode in accordance with the present teachings.

FIG. 4 illustrates an exemplary barcode 60 in accordance with the present teachings. The barcode 60 may include one or more color gradients extending through some or all of the barcode to make it more difficult for a fraudster to reproduce. The color gradients may be adjusted to form an image 62 directly within the barcode 60. The image 62 may be a word, phrase, characters, images, shapes, or a combination thereof. For example, as illustrated in FIG. 4, the image 62 may be the word "GOOD" formed by adjusting the gradient coloring along the barcode providing a visual inspection for the customer and/or retail associate. It should be noted that the image 62 may be used in addition to a hologram printed over and/or under the barcode 60 (see FIGS. 1-3).

ELEMENT LIST

10 Packaging
12 Panel
12A First Panel
12B Second Panel
14 Fold Line
18 Aperture
20 Warning Label
22 Secondary Barcode
30 Prepaid Card
34 Cutout
36 Prepaid Card Barcode
38 Reference Barcode
40 Description
42 Hologram
44 Counterfeit Barcode
60 Barcode
62 Image Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/− 15.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. Packaging comprising:
   a prepaid card at least partially enclosed within the packaging, the prepaid card including:
      a barcode at least partially visible through a cutout in the packaging, the barcode including a color gradient at least partially extending along the barcode to vary a color of the barcode; and
      a first hologram covering at least a portion of the barcode, wherein the first hologram is a pattern printed directly over the barcode such that barcode is scannable through the first hologram; and
   a label located on the packaging, the label including a reference barcode and a second hologram disposed over the reference barcode,
   wherein the barcode is configured to be compared to the reference barcode and the first hologram is configured to be compared to the second hologram to identify counterfeiting or tampering of the prepaid card.

2. The packaging of claim 1, wherein the label is located within a warning label located on a panel of the packaging.

3. The packaging of claim 2, wherein the warning label is positioned adjacent to the barcode of the prepaid card to allow for easy visual comparison of the barcode of the prepaid card and the label.

4. The packaging of claim 2, wherein the warning label includes a textual description describing the first hologram and the barcode.

5. The packaging of claim 1, wherein the color gradient is adjusted along the barcode to form an image printed directly within the barcode.

6. The packaging of claim 1, wherein the packaging is configured to prevent a counterfeit barcode that is placed over the barcode of the prepaid card, and wherein the barcode is scanned and the prepaid card is loaded with funds from a genuine customer.

7. The packaging of claim 1, wherein the barcode is visible in its entirety through the cutout.

8. The packaging of claim 1, wherein the prepaid card is positioned between opposing panels of the packaging to prevent removal of the prepaid card without destruction of the packaging.

9. The packaging of claim 1, wherein the first hologram of and the second hologram are transparent such that the barcode and the reference barcode are scannable.

10. The packaging claim 1, wherein the first hologram is a pattern printed over the barcode that matches a pattern of the second hologram, and the pattern of the first hologram is compared to the patter of the second hologram to determine whether counterfeiting or tampering of the prepaid card occurred.

11. The packaging of claim 1, wherein the reference barcode is separate from the barcode, and the second hologram is printed directly over the reference barcode.

12. The packaging of claim 11, wherein the barcode is larger in scale than the reference barcode.

13. The packaging of claim 1, wherein the packaging includes a first panel disposed on top of a second panel, and the cutout and the label are both located on the first panel.

14. A method of loading the prepaid card of claim 1, comprising:
(a) visually comparing the first hologram to the second hologram to ensure that the first hologram and the second hologram have the same or similar design;
(b) scanning the barcode; and
(c) scanning a secondary barcode located on the packaging.

15. The method of claim 14, wherein if the first hologram does not match the second hologram, the packaging is considered to be tampered with and is disposed of.

16. The method of claim 14, wherein the secondary barcode is scanned prior to scanning the barcode of the prepaid card, and the secondary barcode is different than the barcode of the prepaid card.

17. The packaging of claim 1, wherein the first hologram is configured to be compared to the second hologram to determine if a pattern of the first hologram matches a pattern of the second hologram.

18. The packaging of claim 5, wherein the image is a word or a shape that is printed directly within the barcode.

19. The packaging of claim 1, wherein the first hologram and the second hologram include a reflective pattern.

20. The packaging of claim 1, wherein the reference barcode includes a color gradient at least partially extending along the reference barcode to vary a color of the reference barcode, and wherein the color gradient of the reference barcode matches the color gradient of the barcode.

* * * * *